Patented Aug. 2, 1932

1,870,003

UNITED STATES PATENT OFFICE

HOWARD M. ELSEY, OF OAKMONT, AND ALVIN T. KROGH, OF WILKINSBURG, PENNSYLVANIA, ASSIGNORS TO WESTINGHOUSE ELECTRIC AND MANUFACTURING COMPANY, A CORPORATION OF PENNSYLVANIA

COATING FOR THERMIONIC DEVICES

No Drawing. Application filed June 1, 1927. Serial No. 195,862.

Our invention relates to thermionic devices; more specifically to means for providing effective oxide-coated cathodes.

It is among the objects of our invention to provide means for retarding and preventing the oxidation of the foundation metal of an oxide-coated cathode during the preparation thereof.

Another object of our invention is to provide means for reducing a small amount of oxide during the preparation of an oxide-coated cathode and for retarding chemical changes in the foundation metal and in the coating compound before the vehicle in the coating compound is removed.

Heretofore oxide-coated electrodes have been made by treating the electrodes with a hydrous solution or a suspension containing a material that will produce water and an oxide or carbonate of an alkaline earth when the filament is heated in an atmosphere of carbon dioxide. Treatment with such material resulted in the formation of oxides of the foundation metal, and, although the amount of the oxide of the foundation metal was oftentimes extremely small, nevertheless, such an oxide was present in an amount sufficient to variably and detrimentally affect the operation of the thermionic device. The effect of such impurities in the coating of a base-metal filament was particularly noticeable when a water suspension or solution of alkaline earth carbonates or hydrazides was used, since the water was an oxidizing agent at the temperature at which the electrode was heated to form an adherent coating of carbonate.

We provide a coating compound consisting of a substantially water-free vehicle and a body comprising compounds of the alkaline earths. The vehicle consists essentially of a fluid organic material that will volatilize at a comparatively low temperature, that is, not higher than 200° C. and will provide a reducing atmosphere when it is heated. Such fluids are organic alcohols, aldehydes and ketones. We prefer to mix the body material with 95% to 100% methyl or ethyl alcohol, as the fluid vehicle, but an alcohol containing as much as 10% water may be used successfully without oxidizing the foundation metal. Denatured alcohol, containing about 10% methyl alcohol, 85% ethyl alcohol and 5% water, is suitable, and mixtures of other alcohols are useful.

The body of the coating compound may consist essentially of a hydrazide salt of barium or of one or more of the other alkaline-earth metals or of one or more of the carbonates of one of the alkaline-earth metals, or mixtures of carbonates and hydrazides. We have found that the mixed carbonates of barium and strontium provide a suitable coating when they are mixed in equimolecular proportions, although other proportions of the carbonates and mixtures of other carbonates or any one of them may be used for the body, if desired.

Since coatings of various thicknesses are desired for various purposes, the body material is thinned with a sufficient amount of the vehicle to provide a coating of the desired thickness on the electrode surface when the electrode is brushed with, or passed through, the coating compound. If a comparatively thin coating is desired, a comparatively large amount of thinner is added, and, if a thicker coating is desired, a smaller amount of thinner is added.

The proportion of body to thinner varies with the results desired and may be varied from 40% to 80% of ethyl or denatured alcohol in the mixture of carbonates or in a barium hydrazide mixture. However, we prefer 60% to 95% ethyl alcohol in a carbonate mixture and 50% of the alcohol in the barium hydrazide mixture. In coating a base metal wire, such as nickle, for thermionic purposes, we pass the wires through the coating material. The wire is then passed into a closed furnace in which a carbon dioxide atmosphere is maintained and it is heated to a temperature higher than 200° and lower than 1000° C., in order, in the first place, to evaporate the vehicle. The heated alcohol vapor provides a reducing atmopshere throughout the body of the coating and prevents the formation of products of oxidation from the foundation metal and water vapor or other oxidizing agents. If a hard adherent sintered coating of carbonate is desired, the wire is heated to a temperature of about 950° C. If a thicker coating is desired, the coating and heating may be repeated. After the heat treatment, the wire is removed from the furnace and cooled.

In making an enclosed thermionic device, the carbonate-coated wire may be mounted in the device and heated to transform the carbonate into oxide. The carbon dioxide gas may then be removed from the enclosure.

We have described a specific embodiment of our invention, various modifications of which may be made without departing from the spirit and scope thereof. Therefore, we desire to be limited only by the prior art and by what is defined in the appended claims.

We claim as our invention:

1. A coating material comprising a hydrazide salt of an alkaline-earth metal and a vehicle, said vehicle being a volatile organic compound capable of producing a reducing atmosphere when heated.

2. A coating material comprising a barium hydrazide, and a vehicle, said vehicle being a volatile organic compound capable of producing a reducing atmosphere when heated.

3. The process of making a coating of alkaline-earth carbonate on an oxidizable foundation material which comprises covering the foundation metal with a mixture including a compound of one or more of the alkaline-earth metals and a volatile organic compound that is capable of forming a reducing atmosphere when it is heated and then heating the metal above 200° C. in an atmosphere of carbon dioxide.

4. The process of making a coating of alkaline-earth carbonate on an oxidizable foundation material which comprises covering the foundation metal with a mixture including a compound of one or more of the alkaline-earth metals and a volatile organic compound that is capable of forming a reducing atmosphere when it is heated and then heating the metal to 950° C. in an atmosphere of carbon dioxide.

5. A coating material comprising a mixture of one or more of the alkaline-earth-metal carbonates, an alkaline-earth-metal hydrazide and a volatile organic compound capable of producing a reducing atmosphere when heated.

In testimony whereof we have hereunto subscribed our names this 26th day of May, 1927.

HOWARD M. ELSEY.
ALVIN T. KROGH.